(12) United States Patent
Espedal (10) Patent No.: US 8,277,146 B2
(45) Date of Patent: Oct. 2, 2012

(54) WAVE POWER PLANT

(75) Inventor: Julius Espedal, Asker (NO)

(73) Assignee: Langlee Wave Power AS, Hvalstad (NO)

( * ) Notice: Subject to any disclaimer, the term of this patent is extended or adjusted under 35 U.S.C. 154(b) by 329 days.

(21) Appl. No.: 12/531,263

(22) PCT Filed: Mar. 13, 2008

(86) PCT No.: PCT/NO2008/000095
§ 371 (c)(1),
(2), (4) Date: Dec. 14, 2009

(87) PCT Pub. No.: WO2008/111849
PCT Pub. Date: Sep. 18, 2008

(65) Prior Publication Data
US 2010/0111609 A1    May 6, 2010

(30) Foreign Application Priority Data

Mar. 14, 2007 (NO) .................................. 20071393
May 16, 2007 (NO) .................................. 20072511
Sep. 17, 2007 (NO) .................................. 20074725

(51) Int. Cl.
*E02B 9/00* (2006.01)
(52) U.S. Cl. ................. 405/75; 405/76; 290/53
(58) Field of Classification Search ............... 405/75, 405/76, 77, 79; 60/497; 290/53
See application file for complete search history.

(56) References Cited

U.S. PATENT DOCUMENTS

| 1,746,613 | A | 2/1930 | Shuler |
| 1,960,622 | A | 5/1934 | DuPont |
| 3,928,967 | A | 12/1975 | Salter |
| 4,034,231 | A | 7/1977 | Conn et al. |
| 4,075,382 | A * | 2/1978 | Chapman et al. ............. 428/192 |

(Continued)

FOREIGN PATENT DOCUMENTS

FI    119791 B    3/2009

(Continued)

OTHER PUBLICATIONS

Rossi et al., "Rapid, Low-Technology Field- and Laboratory-Applicable Enzyme-Linked Immunosorbent Assays for Immunodiagnosis of *Schistosoma mansoni*", Journal of Clinical Microbiology, Sep. 1991, vol. 29, No. 9, pp. 1836-1841.

(Continued)

*Primary Examiner* — Tara Mayo-Pinnock
*Assistant Examiner* — Benjamin Fiorello
(74) *Attorney, Agent, or Firm* — Birch, Stewart, Kolasch & Birch, LLP (57) ABSTRACT

An improved wave energy collecting apparatus comprising a frame (1) including at least one hinged (2) vertically tilting or rotating surface (3), such as a barrier in the form of a panel or a sail, for collecting energy from passing wave pressure fronts via a tilting or rotating motion within the frame (1), wherein the hinge (2) is positioned below the surface of the fluid at the trough of the passing waves, said barrier (3) being connected to a device capable of transforming the tilting or rotating motion into different types of energy, wherein the apparatus is located at a depth such that the tilting or rotating barrier (3) breaks the surface of passing waves at the crest of the waves. Such an apparatus may also include vertically positioned side walls (4) for directing the pressure fronts from passing waves towards the tilting barrier (3).

21 Claims, 4 Drawing Sheets

U.S. PATENT DOCUMENTS

| | | | |
|---|---|---|---|
| 4,170,738 A * | 10/1979 | Smith | 290/42 |
| 4,210,821 A | 7/1980 | Cockerell | |
| 4,258,270 A | 3/1981 | Tornkvist | |
| 4,371,788 A | 2/1983 | Smith, Jr. | |
| 4,400,940 A | 8/1983 | Watabe et al. | |
| 4,490,621 A | 12/1984 | Watabe et al. | |
| 4,552,512 A | 11/1985 | Gallup et al. | |
| 4,552,514 A | 11/1985 | Hagen | |
| 4,580,400 A | 4/1986 | Watabe et al. | |
| 4,843,249 A * | 6/1989 | Bussiere | 290/53 |
| 6,568,878 B2 * | 5/2003 | Woodall et al. | 405/25 |
| 2004/0007881 A1 | 1/2004 | Kobashikawa et al. | |
| 2005/0066654 A1 | 3/2005 | Koivusaari | |
| 2006/0150626 A1 | 7/2006 | Koivusaari et al. | |
| 2007/0207028 A1 | 9/2007 | Nicholas et al. | |
| 2008/0018113 A1 | 1/2008 | Tal-or | |
| 2008/0022915 A1 | 1/2008 | Budd | |
| 2008/0191485 A1 | 8/2008 | Whittaker et al. | |
| 2009/0001729 A1 | 1/2009 | Winsloe | |
| 2009/0160193 A1 | 6/2009 | Farb | |
| 2009/0217657 A1 | 9/2009 | Budd | |
| 2010/0296875 A1 | 11/2010 | Thomson | |

FOREIGN PATENT DOCUMENTS

| | | |
|---|---|---|
| FI | 20080038 U1 | 1/2010 |
| FR | 2858667 A1 | 2/2005 |
| GB | 2 028 435 A | 3/1980 |
| GB | 2 196 699 A | 5/1988 |
| GB | 2211896 A | 7/1989 |
| GB | 2 255 807 A | 11/1992 |
| JP | 57-81168 A | 5/1982 |
| KR | 10-2006-0094536 A | 8/2006 |
| WO | WO 98/17911 A1 | 4/1998 |
| WO | WO 02/077447 A1 | 10/2002 |
| WO | WO-2004/097212 A1 | 11/2004 |
| WO | 2006/020568 A1 | 2/2006 |
| WO | WO-2006/100436 A1 | 9/2006 |
| WO | WO 2007/125156 A1 | 11/2007 |
| WO | WO-2007/129299 A2 | 11/2007 |
| WO | WO 2009/030915 A1 | 3/2009 |
| WO | WO 2010/001426 A1 | 1/2010 |
| ZA | 200603170 A | 9/2007 |

OTHER PUBLICATIONS

"Rapid, Low-Technology, Field- and Laboratory-Applicable Immunodiagnosis of *Schistosoma mansoni*", J. Clin. Microbiol., Letters to the Editor, pp. 2522.

Akers et al., "Hydraulic Power System Analysis", Chapter 11, pp. 277-290.

* cited by examiner

WAVE POWER PLANT

BACKGROUND OF THE INVENTION (1) Field of the Invention

The present application relates to an apparatus for collection and conversion of wave energy in a fluid mass, said apparatus comprising a frame including a hinged vertically tilting surface, such as a barrier in the form of a panel or a sail, for collecting energy from passing wave pressure fronts and liquid particle motion via a tilting or rotating motion within the frame, wherein the hinge is positioned below the surface of the fluid at the trough of the respective waves, said barrier in the form of a panel or a sail being connected to a device capable of converting the tilting motion or rotational motion into different types of energy. According to an example of embodiment, the apparatus will be positioned as perpendicular as possible to the direction of travel of the waves and will be placed at a depth such that the tilting or rotating barrier in the form of a panel or a sail barely breaks the surface of the fluid at the crest of the respective waves. According to other aspects of the present invention, the apparatus according to the present invention may be positioned at other depths as well. The frame and/or barrier in the form of a panel and/or a sail preferably includes vertically positioned side walls for directing the pressure fronts of passing waves in towards the tilting barrier in the form of a panel or a sail. The expression "breaks the surface of the respective waves" means that the top of the barrier preferably lies within some boundaries from the crest of the respective waves, wherein the boundaries are defined according to practical considerations for the actual application of the apparatus. According to an example of embodiment, the height of the barrier above the water will be adjusted to suit the height of the actual waves from which the energy is to be collected, i.e., in relation to, for example, the weather conditions at the geographical location where the apparatus is installed, the current and bottom conditions at the relevant geographical area etc. However, the design of ocean deployed power plants must take into consideration a plurality of additional design constraints other than as effectively as possibly converting wave power into for example electric power.

The environment at open sea can be extreme, for example, the mechanical construction of the power plant must withstand what is known as the 100 year wave, which can destroy almost any installation at open sea. These design criteria and other environmental considerations provided for in official regulations can make the economy of the wave power plant unprofitable. Therefore, it is also an objective of the present invention to provide a wave power plant that is cheap to manufacture and maintain, and that at the same time is robust enough to withstand harsh environmental conditions.

The world has an enormous need for energy sources that does not pollute and is renewable, and, as such, energy from the ocean and the air appears to be an excellent option. Energy from the air is currently harnessed via windmills, but even though a number of installations and apparatus for collecting and converting energy from waves in the ocean and from lakes are known, the net output of such wave-energy collecting and converting installations and apparatus is still too small to be economically warrantable.

(2) Description of Related Art

Apparatus are previously known which attempt to collect energy from the ocean, so-called energy installations, which convert wave energy and also tidal energy into, for example, electric power which exploits the horizontal pressure differences transported by such waves in the water masses as well as tidal differences at the surface of the ocean.

For instance, from US Patent Application 2004/0007881 A1 there is known an energy collecting device which generates energy from vertically travelling pressure waves or fronts in the sea in order to operate a device for reverse osmosis so as to generate fresh water. In this application it is proposed that the apparatus be placed at a depth that is L/2 below the surface, where L represents the wave length of the relevant waves from which the energy is to be collected. The vertically positioned surface that is to collect the wave energy is disclosed as a rectangular panel that stands vertically in the body of water and which drives a horizontally positioned hydraulic pump via a lever arm.

From U.S. Pat. No. 4,371,788 there is known an apparatus for collecting vertical, horizontally travelling pressure waves in the water masses, where the energy is collected using a vertical sail or panel that is located in the surface region of the water masses. It is explained that such an apparatus is connected to mechanical means in order to collect the energy.

Although the prior art is capable of generating energy from horizontally travelling pressure waves in the water masses, none of them include any suggestion of an optimal configuration or design of the collecting surface (barrier). Furthermore, all such apparatus according to the prior art are either hinged above the water and collect wave energy via a tilting action of the barrier in the form of a panel projecting down from the hinge (and do not fully exploit the travelling pressure waves in the water masses), or they are hinged below the surface of the water, but the apparatus is located on the floor of the ocean or the lake and is thus not equipped to exploit the full energy potential of the travelling pressure fronts in the liquid mass (see the explanation below).

Thus, there is a need for an apparatus for optimal collection of wave energy from a fluid medium (sea, ocean or lake) both from small or medium-sized waves (0.5-2 m amplitude) and from large-sized waves (more than 2 m amplitude).

BRIEF SUMMARY OF THE INVENTION

Water is a fluid medium that is affected by wind and currents (thermal, saline etc.) so as to thus form waves in the water masses. A wave forms a vertical pressure front that is transported through the water masses in a horizontal direction, the pressure front that transports energy being equivalent to the amplitude of the relevant wave. Ideally, if a wave meets a fixed obstacle, the wave will be reflected (with an opposite phase), whilst a non-fixed obstacle can refract the wave (in phase). The positioning of an obstacle well submerged in the fluid will result in the waves more or less flowing over the obstacle unaffected. This is the reason that wave collectors which work via a tilting action, and which are located on the bottom of the sea with a large amount of water above the apparatus, will achieve very low efficiency because the energy of the wave will flow over and alongside the barrier in the form of a panel more or less unobstructed and thus retain its energy instead of transferring it to the barrier in the form of a panel.

The positioning of a moving object (for example, a tilting barrier in the form of a panel) close to the surface of the liquid will, however, result in the mass set in motion by the passing wave only having the possibilities of either being reflected by the barrier in the form of a panel, or being refracted by the barrier in the form of a panel (depending on whether the wave can move past the panel or not). In each case, the mass of the wave (as well as its corresponding pressure front) will activate the barrier in the form of a panel or a sail to a much greater degree than if it had been placed on the floor of the ocean or the lake.

The fluidity of the water and pressure front that hits the barrier in the form of a panel or a sail in an energy collecting apparatus will also to a certain extent be deflected via loss/avoidance to the side of the barrier. This consideration has not been taken into account earlier, but helps to raise the efficiency of the wave power collecting apparatus that is driven via collection of horizontally moving pressure fronts.

To solve this problem and increase the efficiency of an apparatus according to the present invention, it is preferred to equip the apparatus with essentially vertical side walls that extend either partly or fully across the working area of the tilting barrier. This will be explained in greater detail below with reference to specific embodiments of the invention. Such side walls will also help to increase the efficiency of wave energy collectors positioned completely below the water surface.

In one embodiment, the present invention relates to an energy collecting apparatus that is to be used in a wave energy plant, wherein said apparatus comprises a vertically extending barrier for collecting wave energy via horizontally travelling pressure fronts, said barrier being movably mounted to a frame and in connection with said frame, and panels which optionally and preferably are present at the sides of and optionally to the side of said frame, said vertical side panels being equipped to guide said wave and/or wave pressure front towards said barrier.

As mentioned above, the barrier in the form of a panel or a sail will move in a tilting motion in the frame whilst rotating about a hinge or an axis of rotation that is below the water surface. Said axis of rotation may be horizontal or vertical, preferably horizontal. Instead of having the harrier in the form of a panel or a sail which executes a tilting motion, it may also be possible to allow the barrier in the form of a panel or a sail to rotate through 360° in the frame. The full 360° rotation will be executed in that the barrier follows and is driven by the motion of the water particles in the waves. However, to insure that a complete 360° rotation will be enabled regardless of any conditions at the site, according to an example of embodiment of the present invention, floating means are attached to the barrier providing a lift of the barrier to an initially upwardly vertically protruding position of the barrier. According to another example of embodiment of the present invention, the barrier itself is manufactured as a hollow floating body. However, regardless of any embodiment providing such a floating action, the buoyancy of the barrier must be restricted not to withstand the tilting and/or rotating movement of the barrier. The buoyancy must be limited to just be sufficiently large enough to provide the lifting as known to a person skilled in the art, and not to provide a substantial resistance against the tilting and/or rotational movement of the barrier.

According to yet another aspect of the present invention, when a wave passes a given point, the water particles (the water) at this point will execute a circular motion (in ideal conditions, i.e., when the water is sufficiently deep). The positioning of a horizontally journal led rotating barrier in the water at a depth equal to or less than half of the wave's wave length (as this depth is the depth at which the relevant wave has some effect on the water particles, $Z=L/2$, where $Z$ is the greatest depth at which the apparatus is to be placed and $L$ is the wave length of the relevant wave, see FIG. 1), will result in the barrier being actuated by the motion of the water to rotate in conformity with the rotation of the water particles. The rotation of the water particles, however, will become more oval as the water becomes shallower (see FIG. 1).

As also mentioned above, the inventive apparatus's tilting (or rotating) barrier in the form of a panel or a sail is preferably positioned so that it barely breaks the water surface at the crest of the relevant wave in its upright (vertical) position. This does not mean that the frame in which the barrier in the form of a panel or a sail moves cannot be placed on the seabed. In fact, the apparatus may be anchored to the seabed (if the water is shallow enough, for example, 640 m deep). Alternatively, the apparatus may be equipped with float means such as pontoons or buoys so as to be suspended in the water masses at a suitable height, and can be anchored to the seabed with securing means such as anchors and/or rods and/or posts. In an example of embodiment of the present invention, the boundaries defined by the expression "barely breaks the water surface" means that the top of the barrier preferably lies within ±1 cm from the crest of the respective waves, but may lie as much as ±0.5 m from the crest of the respective waves.

Alternatively, a plurality of wave energy collecting apparatus according to the invention may be connected to each other and may be supported in a (partly) submerged position by buoys, float means and/or pontoons that are secured to a fixed rod or post that is anchored/secured to the seabed.

The wave energy collectors according to the present invention may also be connected to each other to form an energy collecting system, and they may also be connected to others forms of energy collecting systems such as windmills or solar energy collectors so as thereby to contribute to the total energy output of such an energy plant or assembly.

In addition, the present application relates to a method for generating an energy output from such a wave energy system by placing an energy collecting barrier in the form of a panel or a sail at the surface of the water masses in order optimally to actuate the barrier via the passing waves.

Energy output from said energy system may be obtained in different ways. One way may be to generate usable energy by allowing the tilting barrier in the form of a panel or a sail to directly actuate, for example, a mechanical, hydraulic or pneumatic system which performs work directly on any relevant machinery (for example, a dynamo in order to produce electric power).

Alternatively, the tilting barrier in the form of a panel or a sail may actuate a pump that pumps water up to an elevated reservoir from which electric current can be generated by releasing water from the reservoir through a turbine and/or dynamo. Such an embodiment will provide a more constant current than by collecting energy directly from the tilting barrier in the form of a panel or a sail.

BRIEF DESCRIPTION OF THE DRAWINGS

The present invention will be explained in more detail below with reference to the attached figures, wherein.

DETAILED DESCRIPTION OF THE INVENTION

As shown in the figures, the wave energy converting apparatus according to the present invention comprises a frame 1 which supports a hinged 2 tilting or rotating barrier 3 in the form of a panel or a sail that tilts or rotates about the hinge 2 when a wave and associated wave pressure front pass the barrier in the form of a panel/sail 3. It is preferred that the axis of the barrier in the form of a panel/sail 3 and the frame supporting the same are positioned so that said axis 2 is essentially perpendicular to the passing wave pressure fronts, thereby obtaining a maximum energy collecting effect of the barrier in the form of a panel/sail 3.

Figure 1:
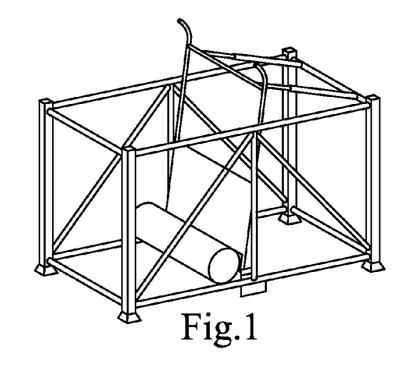
FIG. 1 shows a wave energy collecting apparatus according to the invention comprising a sail/membrane that is placed in a tilting square positioned in a frame. In this embodiment, the sail/membrane can be rolled into a cylinder to reduce the area of the sail/membrane in the case of large waves that represent a risk of the apparatus being-overloaded/damaged.

The barrier in the form of a panel/sail 3 may be configured in different ways. In its simplest form, the bather 3 is in the form of a panel that tilts about the hinge 2. Alternatively, as shown in FIG. 1, the barrier 3 may comprise a square frame containing a sail of flexible cloth of an essentially impermeable material. Such a cloth may, for example, be made of a woven piece of material, a netting-reinforced plastic cloth, a tarpaulin etc. That the barrier 3 is made of a cloth material means that the barrier can be rolled up into a cylinder to reduce the area of the part of the barrier that collects the passing wave pressure fronts, thereby reducing the load on the square and the frame 1. This is advantageous in very high seas where the energy load may damage the frame 1 if the area of the barrier 3 is not reduced. Adjusting the area of the barrier 3 will result in optimal use of the frame 1 in relation to the load it is equipped to withstand. In one embodiment, a load-monitoring device can be connected to the barrier and communicate with a computer for automatic reduction or expansion of the cloth 3 in the frame 1.

Figure 2:
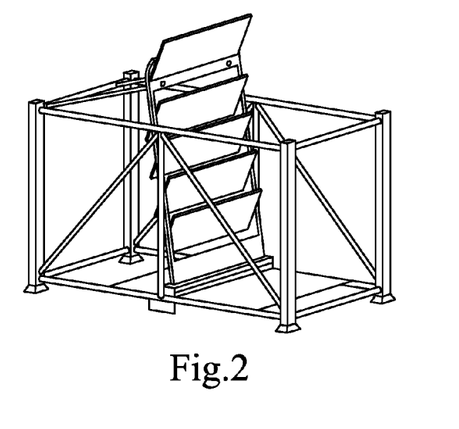
FIG. 2 shows an alternative embodiment where the tilting square consists of smaller squares that can be rotated in order optionally to reduce the load on the apparatus.
Figure 3:
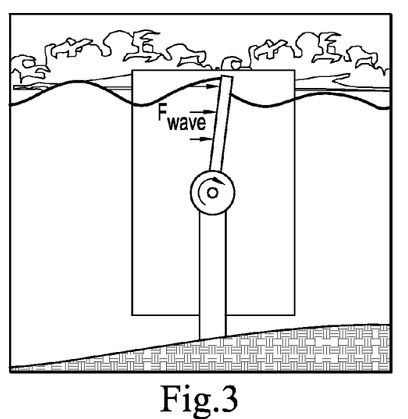
FIG. 3 shows a general outline of the location and working mode of a wave energy collecting apparatus according to the invention.

Another alternative for optimising the load on the barrier 3 is shown in FIG. 2 where the angle of the sub-squares of the barrier 3 can be varied for adjustment of the load from passing pressure waves.

The effect of the area of the barrier 3 will vary with its angle to the seabed as a function of the sine of its angle to the seabed. Thus, a tilting action of the barrier 3 in the frame 1 within an angle range of 90±20°, preferably 90±15°, more preferably 90±10°, is good, and the tilting action will normally be within the angle range off 60°. A pin or a rod may be positioned in the frame 1 to ensure that the barrier 3 does not exceed these limits. However, if such a design should be able to withstand the one hundred year wave, the mechanical strength of this design must be sufficient, which may imply extreme costs for building the wave power plant. According to an example of embodiment of the present invention, a tilt releasing mechanism may be attached to the hinge or rotating axle of the barrier. When a force towards the barrier exceeds a predefined limit (defined by a selected condition providing the actual force, as known to a person skilled in the art), the tilting release mechanism is released allowing the barrier to rotate freely, which implies that the forces of the strong waves will not damage the construction, but only pass over the barrier. With this arrangement it is possible to maintain a simple cost effective design of the wave power plant according to the present invention.

Such considerations are of course not relevant with a fully rotating barrier. This example of a fully rotating barrier (or a barrier being freely rotating due to a release mechanism as described above) is possible to achieve when there is at least one floating member attached to the barrier, or the barrier itself is provides as a floating (hollow) member. The waves can provide a fully 360° rotational movement of the barrier. However, conditions can exist that prevents a full turn of the panel (for example the extreme condition described above). The at least one floating member associated with the barrier will provide a lift of the barrier 3 to an initial starting position, for example a vertically upwardly protruding position of the barrier 3. As understood, the buoyancy of the barrier must be adapted to the operation of the barrier, that is, the barrier must be allowed to be moved (tilted or rotated) without being obstructed by the buoyancy. According to an aspect of the present invention, such a limit of the buoyancy is provided for when the buoyancy is just about large enough to float the barrier, as known to a person skilled in the art. The at least one floating member together with the ability of the barrier 3 to rotate freely, makes it possible to manufacture a wave power plant at a substantially lower cost compared with prior art solutions. For example, the one hundred year wave problem is simply solved by the feature that the barrier 3 is free to rotate. The at least one floating member attached to the barrier (or the barrier is a floating member in itself) guaranties that the power plant is operable after the hundred year wave has passed the wave power plant according to the present invention.

According to another example of embodiment of the present invention, a hydraulic system is connected to the hinge 2, providing a means for converting tilting movements of the barrier 3 into hydraulic pressure changes due to for example hydraulic pumps attached to the shaft 2. When the hydraulic pressure builds up in the hydraulic loop due to the tilting of the barrier, the pressure build up will eventually be large enough to stop the tilting movement of the barrier. The pressure build up may be used to move a crank turning an electric generator, for example. When the pressures build up stops, the barrier starts moving in an opposite direction, which again moves the crank etc. These hydraulic pumps can be operated as known to a person skilled in the art. However, the tilting movement implies that a fully rotational movement of the barrier is restricted, which would be advantageous to be able to do if a hundred year wave approaches the wave power plant, for example, as described above. According to an example of embodiment of the present invention, a relief valve in the hydraulic loop will be released if the pressure inside the hydraulic loop exceeds a predefined limit. The predefined limit can be related to for example the pressure build up that would be expected to occur in the hydraulic loop when hit by a wave of a certain dimension. When the limit is exceeded, the relief valve is released providing release of the hydraulic pressure inside the loop enabling a free rotational movement of the barrier as discussed above. The at least one floating member attached to the barrier provides a lift of the barrier to an in initial starting point. At this point the pressure inside the hydraulic loop is low, for example below a second predefined level. When the pressure is below the second predefined pressure level inside the hydraulic loop, the relief valve is closed permitting new tilting movements of the barrier 3 as disclosed above. With such an arrangement, the operational safety of the wave power plant according to the present invention is achieved without any additional cost for materials, or additional complexity in the design of the wave power plant etc.

To collect wave energy and transform it into usable energy, the barrier may actuate a plurality of pistons having telescopic action. This action may be used to drive a pump or a generator in order to produce or store the collected energy. One example of this embodiment is shown in FIG. 6 where a system for generating and storing electric energy is shown.

Figure 5:
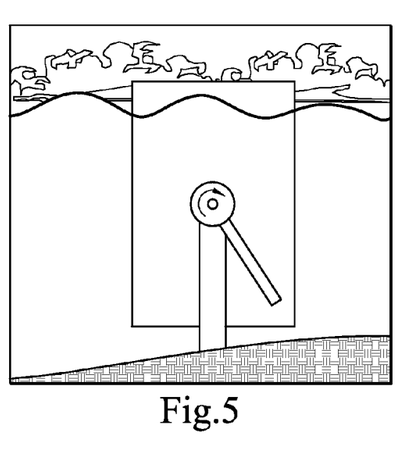
FIG. 5 shows the same system as that shown in FIG. 3, where the apparatus barrier in the form of a panel and/or a sail can be rotated.

A system for making a fully rotating wave energy collecting apparatus according to the invention is shown in FIG. 5. In this figure, the barrier 3 is shown in a position pointing downwards. However, because of the rotational motion of the water, the barrier 3 will move in a circular motion that brings the barrier 3 back up after a wave has passed the apparatus.

Figure 4:
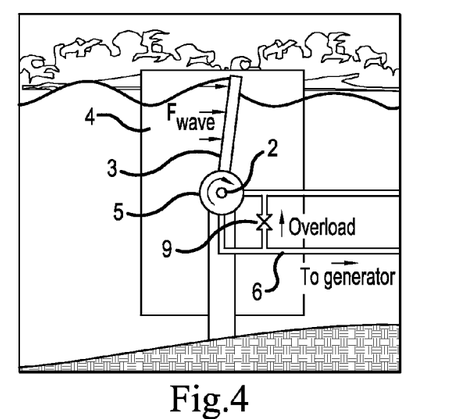
FIG. 4 shows the same apparatus as that shown in FIG. 3, but with a secondary energy collecting system connected to the wave energy collecting apparatus.
Figure 6:
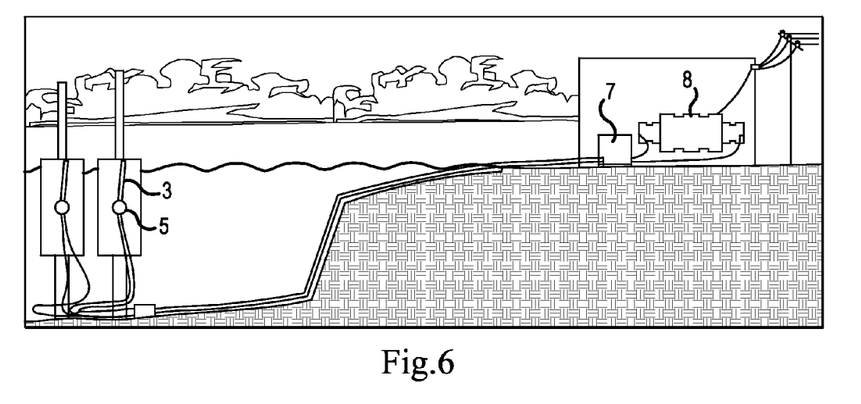
FIG. 6 shows an electric generating system based on connected wave energy collecting apparatus according to the invention.
Figure 7:
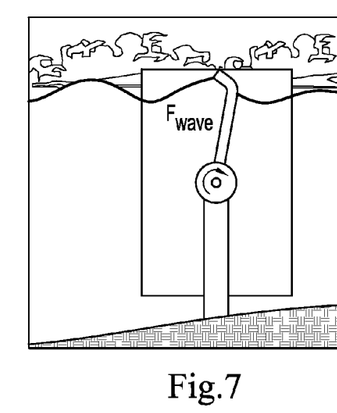
FIG. 7 shows a wave energy collecting apparatus according to the invention where the wave collecting barrier in the form of a panel or a sail has been given an alternative form.

An overload protecting system for the apparatus according to the invention is shown in FIG. 4 and can be seen in connection with the electric generating system shown in FIG. 6. The function of this system is as follows: The pressure from the waves causes the panel 3 to rotate about the axis/hinge 2. This generates pressure in a hydraulic pump 5. The pressure is transferred through pipe 6 to a hydraulic motor 7 that is connected to an electric generator 8 which produces electric power. In connection with high waves, the wave pressure will exceed the limit of what the system is equipped to withstand (frame, pipe, motor etc.), and the oil pressure will automatically be reduced by a pressure control valve 9, where surplus energy in the form of heat is cooled off by the seawater. The wave energy collector can be rotated about a rod 11 so as to be directed towards the wave direction and, in respect of its height 12, so as to be adjusted to the tide and the wave height.

Figure 8:
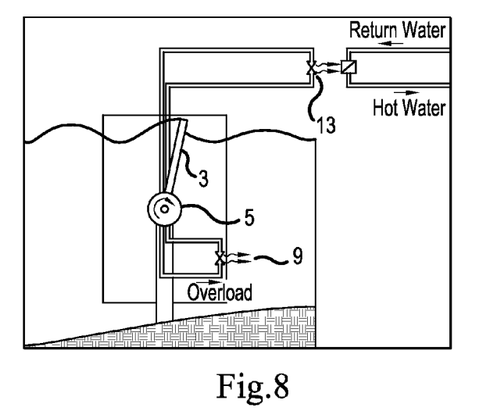
FIG. 8 shows a wave energy collecting apparatus according to the invention where the collected energy is used to heat secondary sub-system comprising water as a heat transporting medium.

Alternatively, as shown in FIG. 8, the oil pressure for driving a motor can be reduced directly across a reducing valve 13, whereby heat is formed and is used for heating purposes, for example, a distance heating plant. An overpressure system 9 is still necessary to reduce the heat production so that the system does not produce more heat than necessary. One embodiment of such a system employs a wave energy collecting system which produces hydraulic pressure and a hydraulic brake. One type of usable hydraulic brake may, although need not, be a system which is used in hoisting cranes to control the speed of lowering loads. The energy produced in the brake is converted into heat that is removed from the brake by a cooling system. With the wave-to-heat system, the energy generated in the brake is used for heating purposes, for example, in buildings. This may, although need not, be connected to a district heating plan.

An alternative way of producing heat is to connect the wave energy collecting apparatus according to the invention directly to a heat pump. Such heat pumps are known technology where compression of gas increases the temperature of the system.

The advantages of generating heat from waves are due to the nature of the waves where the energy generated may often result in an oscillating energy production. Because of the stored energy in a heating system, the system is less dependent on a constant energy supply. The system has high power efficiency because it transforms energy directly into heat that is a very low energy form.

In northern areas, there are normally more waves during the cold season of the year (the winter). This corresponds to the demand for heating.

Figure 9:
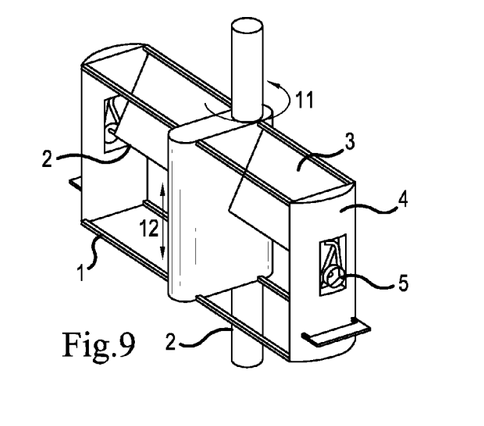
FIG. 9 shows a double barrier in the form of a panel/sail embodiment of a wave energy collecting apparatus according to the invention comprising side walls to direct the waves in towards the tilting/rotating barrier in the form of panels/sails.
Figure 10:
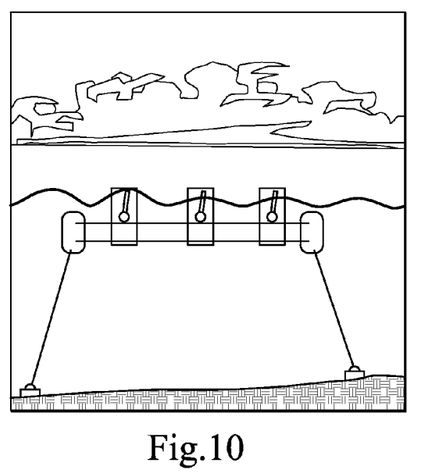
FIG. 10 shows an embodiment of a wave collecting system that uses wave energy collecting apparatus according to the invention which are connected to each other and which are held at a suitable depth by pontoons or buoys, said pontoons or buoys being anchored to the seabed. The depth of the wave energy collecting system can in this embodiment be adjusted by adjusting the length of the mooring ropes or wires, or may be equipped with self-adjusting devices (for example, by placing a weight on each mooring rope or wire so as thereby to form slack in the rope or wire which can be used when the system is raised via the action of, for example, the tide).
Figure 11:
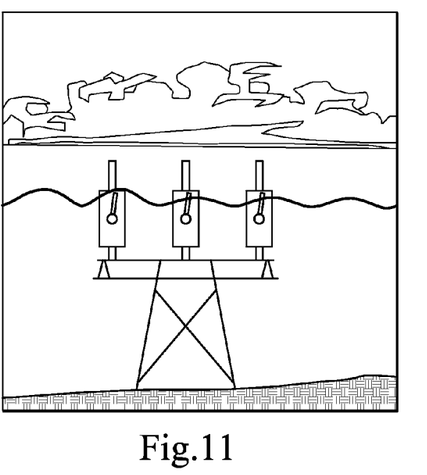
FIG. 11 shows an alternative embodiment of a wave energy collecting system where the collectors according to the invention are mounted on a platform that is positioned on the seabed, and where the height of the wave collectors can be adjusted in that they are placed on vertical rods.
Figure 12:
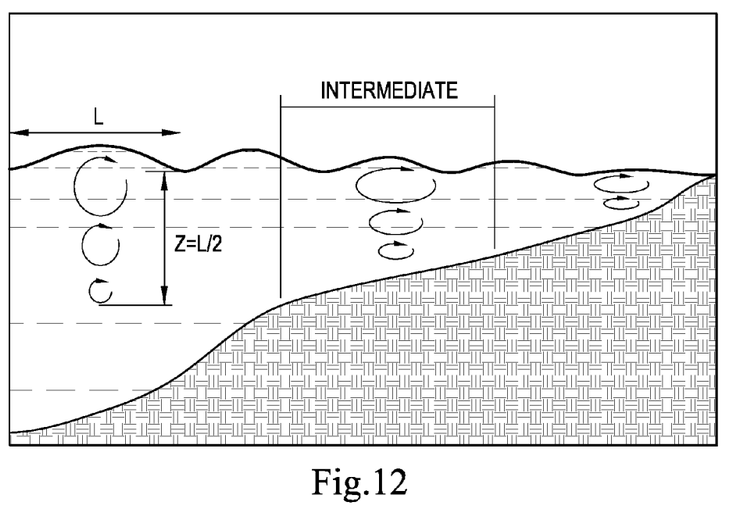
FIG. 12 shows the motion of water particles that are executed via passing waves.
Figure 13:
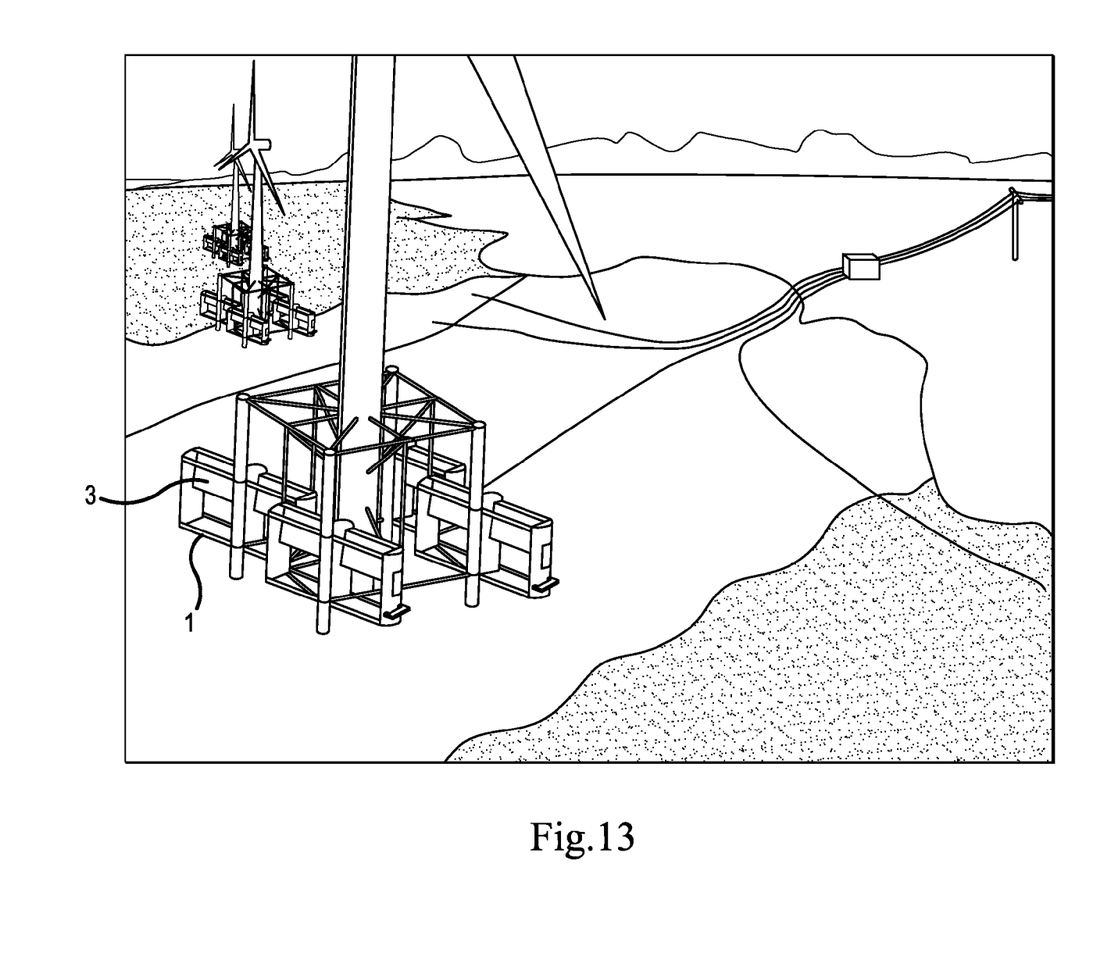
FIG. 13 shows a wave collecting system according to the invention combined with windmills to collect an optimal amount of energy from the passing wind and waves.

An alternative embodiment of the wave energy collecting system according to the present invention is shown in FIG. 9. In this embodiment, the barrier 3 that collects the wave pressure energy is placed in a two-compartment frame 1 which comprises side walls 4 for directing the wave energy in towards the barriers (panels/sails) 3 without deflecting the energy to the sides of the barriers 3. An outline of an energy collecting/transforming system 5 is shown in one of the side walls. Such a system may, for example, be one as described above.

The invention claimed is:

1. An apparatus for collecting and transforming wave energy in a fluid mass, said apparatus comprising a frame including at least one hinged tilting or rotating surface, in the form of a barrier, for collecting energy from passing wave pressure fronts via a tilting or rotating motion within the frame, wherein the hinge is positioned below the surface of the fluid at the trough of the passing waves, said barrier being connected to a device capable of transforming the tilting or rotating motion into different types of energy, wherein said barrier is arranged to provide a buoyancy just large enough to lift rotationally the barrier around the hinge from a downwardly pointing direction towards the seabed to an upwardly pointing vertical upright position, wherein the barrier is allowed to rotate through 360° in the frame, wherein the hinge is attached to a tilting release mechanism that release the hinge such that the barrier can rotate freely around the hinge, and wherein the tilting release mechanism is released when a force from a wave passing the apparatus exceeds a predefined limit,
wherein the hinge of the barrier is positioned horizontally in the fluid, and the hinge is arranged at the lower edge of the barrier when the barrier is in the upwardly pointing position, and the apparatus is equipped with a float device so as to be suspended in the fluid mass at a suitable height.

2. The apparatus according to claim 1, wherein the frame and/or barrier comprises vertically positioned side walls for directing the pressure fronts from passing waves in towards the tilting bather.

3. The apparatus according to claim 1, wherein the apparatus is located at a depth such that the top of the tilting or rotating barrier breaks the surface of passing waves at the crest of the waves.

4. The apparatus according to claim 1, wherein the area of the barrier is adjustable.

5. The apparatus according to claim 1, wherein the barrier is in the form of a panel or a sail.

6. The apparatus according to claim 1, wherein the tilting release mechanism includes a relief valve.

7. A system for collecting wave energy from a body of fluid, wherein the system comprises an apparatus according to claim 1.

8. The system according to claim 7, further comprising a plurality of the apparatuses connected to each other and held at a suitable depth by pontoons or buoys, said pontoons or buoys being anchored to the seabed.

9. A method comprising: (a) utilizing the apparatus according to claim 1; and (b) generating heat from said apparatus.

10. A method comprising: (a) utilizing the system according to claim 7; and (b) generating heat from said system.

11. An apparatus for collecting and transforming wave energy from horizontally travelling pressure waves in a fluid mass, said apparatus comprising a frame including at least one hinged tilting or rotating surface, in the form of a barrier, for collecting energy from passing wave pressure fronts via a tilting or rotating motion within the frame, wherein the hinge is positioned below the surface of the fluid at the trough of the passing waves, said barrier being connected to a device capable of transforming the tilting or rotating motion into different types of energy, and wherein the frame and/or barrier comprises vertically positioned side walls for directing the pressure fronts from passing waves towards the tilting barrier, wherein said barrier is arranged to provide a buoyancy just large enough to lift rotationally the barrier around the hinge from a downwardly pointing direction towards the seabed to an upwardly pointing vertical upright position, and wherein the barrier is allowed to rotate through 360° in the frame, wherein the hinge of the barrier is positioned horizontally in the fluid, and the hinge is arranged at the lower edge of the barrier when the barrier is in the upwardly pointing position, and the apparatus is equipped with a float device so as to be suspended in the fluid mass at a suitable height.

12. The apparatus according to claim 11, wherein the area of the barrier is adjustable.

13. The apparatus according to claim 11, wherein the hinge is attached to a tilting release mechanism that release the hinge such that the barrier can rotate freely around the hinge, wherein the tilting release mechanism is released when a force from a wave passing the apparatus exceeds a predefined limit.

14. The apparatus according to claim 1, wherein the barrier is attached to at least one float member providing the necessary buoyancy of the barrier.

15. The apparatus according to claim 1, wherein the barrier is provide for as a hollow body providing the necessary buoyancy of the barrier.

16. The apparatus according to claim 11, wherein the barrier is attached to at least one float member providing the necessary buoyancy of the barrier.

17. The apparatus according to claim 11, wherein the barrier is provide for as a hollow body providing the necessary buoyancy of the barrier.

18. The apparatus according to claim 11, wherein the barrier is in the form of a panel or a sail.

19. A system for collecting wave energy from a fluid mass, wherein the system comprises an apparatus according to claim 11.

20. A method comprising: (a) utilizing the apparatus according to claim 11; and (b) generating heat from said apparatus.

21. A method comprising: (a) utilizing the system according to claim 19; and (b) generating heat from said system.

* * * * *